US012779368B2

(12) United States Patent
Ozawa et al.

(10) Patent No.: US 12,779,368 B2
(45) Date of Patent: Nov. 3, 2026

(54) GAS SOLUTION SUPPLY APPARATUS

(71) Applicant: EBARA CORPORATION, Tokyo (JP)

(72) Inventors: Suguru Ozawa, Tokyo (JP); Yuji Araki, Tokyo (JP); Yoichi Nakagawa, Tokyo (JP); Toshifumi Watanabe, Tokyo (JP); Risa Kimura, Tokyo (JP); Ryuta Kato, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 493 days.

(21) Appl. No.: 18/363,815

(22) Filed: Aug. 2, 2023

(65) Prior Publication Data

US 2024/0075410 A1 Mar. 7, 2024

(30) Foreign Application Priority Data

Sep. 2, 2022 (JP) ................................ 2022-140048

(51) Int. Cl.
*B01D 19/00* (2006.01)
*B01F 21/00* (2022.01)

(52) U.S. Cl.
CPC .......... *B01D 19/0036* (2013.01); *B01F 21/02* (2022.01)

(58) Field of Classification Search
CPC . B01D 19/0036; B01D 19/0073; B01F 21/02; B01F 23/2323; B01F 23/237613; B01F 23/29; B01F 23/803; B01F 23/2319; B01F 23/23; B01F 23/231141; B01F 23/23121; B01F 35/71; B01F 35/754; B01F 2101/24; H10P 72/0404; H10P 72/0411
See application file for complete search history.

(56) References Cited

U.S. PATENT DOCUMENTS

| | | | | |
|---|---|---|---|---|
| 9,248,415 | B2 * | 2/2016 | Osborn | C02F 1/78 |
| 2003/0080037 | A1 | 5/2003 | Mazzei | |
| 2015/0122126 | A1 * | 5/2015 | Lanzingh | B01D 19/0036 96/201 |
| 2019/0015801 | A1 | 1/2019 | Ozawa et al. | |
| 2019/0300405 | A1 * | 10/2019 | Mante | A61L 2/183 |
| 2019/0335789 | A1 * | 11/2019 | Dray | A23L 2/54 |
| 2020/0071208 | A1 * | 3/2020 | Seiwert | A61L 2/183 |

(Continued)

FOREIGN PATENT DOCUMENTS

| | | | |
|---|---|---|---|
| JP | 2002-119835 | A | 4/2002 |
| JP | 2011-230062 | A | 11/2011 |
| JP | 6826437 | B2 | 2/2021 |

*Primary Examiner* — Dung H Bui

(74) *Attorney, Agent, or Firm* — Chrisman Gallo Tochtrop LLC

(57) ABSTRACT

There is provided a gas solution supply apparatus capable of preventing bubbles from being generated in use at a point-of-use even if gas solution to be provided to a point-of-use has a high concentration. The gas solution supply apparatus 1 includes: a gas dissolving unit 4 that dissolves a source gas in a source liquid to produce a first gas solution; a first gas-liquid separator 10 that stores the first gas solution produced and produces a second gas solution through gas-liquid separation of the first gas solution; a pressure reducer 17 that depressurizes the second gas solution produced in the first gas-liquid separator 10; and a second gas-liquid separator 12 that stores the depressurized second gas solution and produces a third gas solution through gas-liquid separation of the second gas solution. The third gas solution is supplied to a point-of-use.

3 Claims, 8 Drawing Sheets

(56) References Cited

U.S. PATENT DOCUMENTS

| | | | | |
|---|---|---|---|---|
| 2021/0017056 | A1 | 1/2021 | Nakagawa et al. | |
| 2023/0347263 | A1* | 11/2023 | Richardson ............ | B01D 17/02 |
| 2024/0075410 | A1* | 3/2024 | Ozawa ............... | B01D 19/0036 |

* cited by examiner

GAS SOLUTION SUPPLY APPARATUS

BACKGROUND OF THE INVENTION

Field of the Invention

The present invention relates to a gas solution supply apparatus that supplies a gas solution.

Description of the Related Art

Recent cleaning of products in semiconductor device factories and electronic component manufacturing factories such as liquid crystals has been growing sophisticated with the manufacturing processes growing complicated and the circuit patterns growing fine. For example, fine particles, metals, organic substances, etc. adhering to silicon wafers are removed with a special liquid made by dissolving high-purity gas, or high-purity gas and chemicals in functional water.

The functional water to be used is, for example, ozone water. Ozone water is produced with an ozone water manufacturing apparatus that dissolves ozone gas (a mixed gas of ozone and oxygen), which is a source gas, into pure water, which is a source liquid (see, for example, Japanese Patent No. 6826437). Since ozone dissolved in ultrapure water has a very strong oxidizing power even at a low concentration (several ppm), it can remove organic substances and metals.

As described above, ozone gas is a mixed gas of ozone and oxygen, and the maximum ozone gas concentration is about 20 vol % regardless of the production method, and the remaining 80 vol % consists of oxygen. Therefore, ozone water, which is made by dissolving ozone gas in pure water, has more oxygen dissolved in supersaturation than ozone. When the pressure of the ozone water decreases, the gas dissolved in supersaturation is generated as bubbles. For example, when the ozone water is discharged onto the wafer in cleaning of a wafer at a point-of-use (cleaning apparatus) where ozone water is supplied, there is a concern that pressure drop to atmospheric pressure or less in the ozone water may cause bubbles of gas dissolved in supersaturation to be generated. In particular, when the ozone water has a high concentration, bubbles of gas dissolved in supersaturation are likely to be generated. Therefore, there has been a demand for the development of technique that prevents the generation of bubbles in use at point-of-use use.

The present invention has been made in view of the above problem, and an object of the present invention is to provide a gas solution supply apparatus capable of preventing bubbles from being generated in use at a point-of-use even if gas solution to be provided to the point-of-use has a high concentration.

SUMMARY OF THE INVENTION

A gas solution supply apparatus of the present invention includes: a gas dissolving unit that dissolves a source gas in a source liquid to produce a first gas solution; a first gas-liquid separator that stores the first gas solution produced and produces a second gas solution through gas-liquid separation of the first gas solution; a pressure reducer that depressurizes the second gas solution produced in the first gas-liquid separator; and a second gas-liquid separator that stores the second gas solution having been depressurized and produces a third gas solution through gas-liquid separation of the second gas solution, wherein the third gas solution is supplied to a point-of-use.

According to this configuration, when the first gas solution is produced by dissolving the source gas in the source liquid, the produced first gas solution is stored in the first gas-liquid separator and the second gas solution is produced through gas-liquid separation of the first gas solution. Then, the second gas solution is depressurized by a pressure reducer, the depressurized second gas solution is stored in the second gas-liquid separator, and the third gas solution is produced through gas-liquid separation of the second gas solution and is supplied to the point-of-use. In this way, gas-liquid separation after depressurization causes the gas dissolved in supersaturation to be generated as bubbles and removed. Therefore, even if the gas solution (third gas solution) to be supplied to the point-of-use has a high concentration, it is possible to prevent bubbles from being generated in use at the point-of-use.

Further, the gas solution supply apparatus of the present invention may include a first pressurizer that pressurizes the source liquid to be supplied to the gas dissolving unit.

This configuration enables increasing the pressure of the source liquid to be supplied to the gas dissolving unit. This makes it possible to produce high-concentration first gas solution in the gas dissolving unit, enabling production of high-concentration third gas solution.

Further, the gas solution supply apparatus of the present invention may include a second pressurizer that pressurizes the third gas solution to be supplied to the point-of-use.

This configuration enables increasing the pressure of the third gas solution to be supplied to the point-of-use to the pressure required at the point-of-use.

A gas solution supply apparatus of the present invention includes: a gas dissolving unit that dissolves a source gas in a source liquid to produce a first gas solution; a pressure reducer that depressurizes the first gas solution produced; and a gas-liquid separator that stores the depressurized first gas solution and produces a second gas solution through gas-liquid separation of the first gas solution, wherein the second gas solution is supplied to a point-of-use.

According to this configuration, when the first gas solution is produced by dissolving the source gas in the source liquid, the first gas solution produced is depressurized with a pressure reducer, the depressurized first gas solution is stored in gas-liquid separator, and the second gas solution is produced through gas-liquid separation of the first gas solution and is supplied to the point-of-use. In this way, gas-liquid separation after depressurization causes the gas dissolved in supersaturation to be generated as bubbles and removed. Therefore, even if the gas solution (second gas solution) to be supplied to the point-of-use has a high concentration, it is possible to prevent bubbles from being generated in use at the point-of-use.

Further, the gas solution supply apparatus of the present invention may include a first pressurizer that pressurizes the source liquid to be supplied to the gas dissolving unit.

This configuration enables increasing the pressure of the source liquid to be supplied to the gas dissolving unit. This makes it possible to produce high-concentration first gas solution in the gas dissolving unit, enabling production of high-concentration second gas solution.

Further, the gas solution supply apparatus of the present invention may include a second pressurizer that pressurizes the second gas solution to be supplied to the point-of-use.

This configuration enables increasing the pressure of the second gas solution to be supplied to the point-of-use to the pressure required at the point-of-use.

Further, the gas solution supply apparatus of the present invention may be configured such that: the source gas is a mixture of a first source gas and a second source gas; and a partial pressure of the second source gas is higher than a partial pressure of the first source gas, and a solubility of the second source gas is higher than a solubility of the first source gas.

According to this configuration, the partial pressure (for example, total gas pressure P×0.85) of the second source gas (for example, oxygen) is higher than the partial pressure (for example, total gas pressure P×0.15) of the first source gas (for example, ozone), and the solubility of the second source gas (45 mg/L at 20 degrees) is higher than the solubility of the first source gas (20 mg/L at 20 degrees). Therefore, the second source gas is more likely to be dissolved in supersaturation in the source liquid than the first source gas. In other words, second source gas bubbles are likely to be generated. In this case, gas-liquid separation after depressurization causes the gas dissolved in supersaturation (second source gas) to be generated as bubbles and removed. This makes it possible to prevent bubbles from being generated in use at the point-of-use.

A method of the present invention is a method to be performed with a gas solution supply apparatus, and includes: a gas dissolving step of dissolving a source gas in a source liquid to produce a first gas solution; a first gas-liquid separating step of storing the first gas solution produced and producing a second gas solution through gas-liquid separation of the first gas solution; a depressurizing step of depressurizing a second gas solution produced in the first gas-liquid separating step; a second gas-liquid separating step of storing the second gas solution having been depressurized and producing a third gas solution through gas-liquid separation of the second gas solution; and a supplying step of supplying the third gas solution produced in the second gas-liquid separating step to a point-of-use.

According to this method, in the same manner as the apparatus described above, when the first gas solution is produced by dissolving the source gas in the source liquid, the first gas solution produced is stored in the first gas-liquid separator and the second gas solution is produced through gas-liquid separation of the first gas solution. Then, the second gas solution is depressurized by a pressure reducer, the depressurized second gas solution is stored in the second gas-liquid separator, and the third gas solution is produced through gas-liquid separation of the second gas solution and is supplied to the point-of-use. In this way, gas-liquid separation after depressurization causes the gas dissolved in supersaturation to be generated as bubbles and removed. Therefore, even if the gas solution (third gas solution) to be supplied to the point-of-use has a high concentration, it is possible to prevent bubbles from being generated in use at the point-of-use.

A method of the present invention is a method to be performed with a gas solution supply apparatus, and includes: a gas dissolving step of dissolving a source gas in a source liquid to produce a first gas solution; a depressurizing step of depressurizing the first gas solution produced; a gas-liquid separating step of storing the depressurized first gas solution and producing a second gas solution through gas-liquid separation of the first gas solution; and a supplying step of supplying the second gas solution produced in the gas-liquid separating step to a point-of-use.

According to this method, in the same manner as the apparatus described above, when the first gas solution is produced by dissolving the source gas in the source liquid, the first gas solution produced is depressurized with a pressure reducer, the depressurized first gas solution is stored in gas-liquid separator, and the second gas solution is produced through gas-liquid separation of the first gas solution and is supplied to the point-of-use. In this way, gas-liquid separation after depressurization causes the gas dissolved in supersaturation to be generated as bubbles and removed. Therefore, even if the gas solution (second gas solution) to be supplied to the point-of-use has a high concentration, it is possible to prevent bubbles from being generated in use at the point-of-use.

Advantageous Effect of Invention

According to the present invention, it is possible to prevent bubbles from being generated in use at the point-of-use even if the gas solution to be provided to the point-of-use has a high concentration.

DETAILED DESCRIPTION OF THE PREFERRED EMBODIMENTS

A gas solution supply apparatus according to an embodiment of the present invention will be described below with reference to the drawings. In the present embodiment, there will be illustrated a case of an ozone water supply apparatus that supplies ozone water to a wafer cleaning apparatus.

First Embodiment

Figure 1:
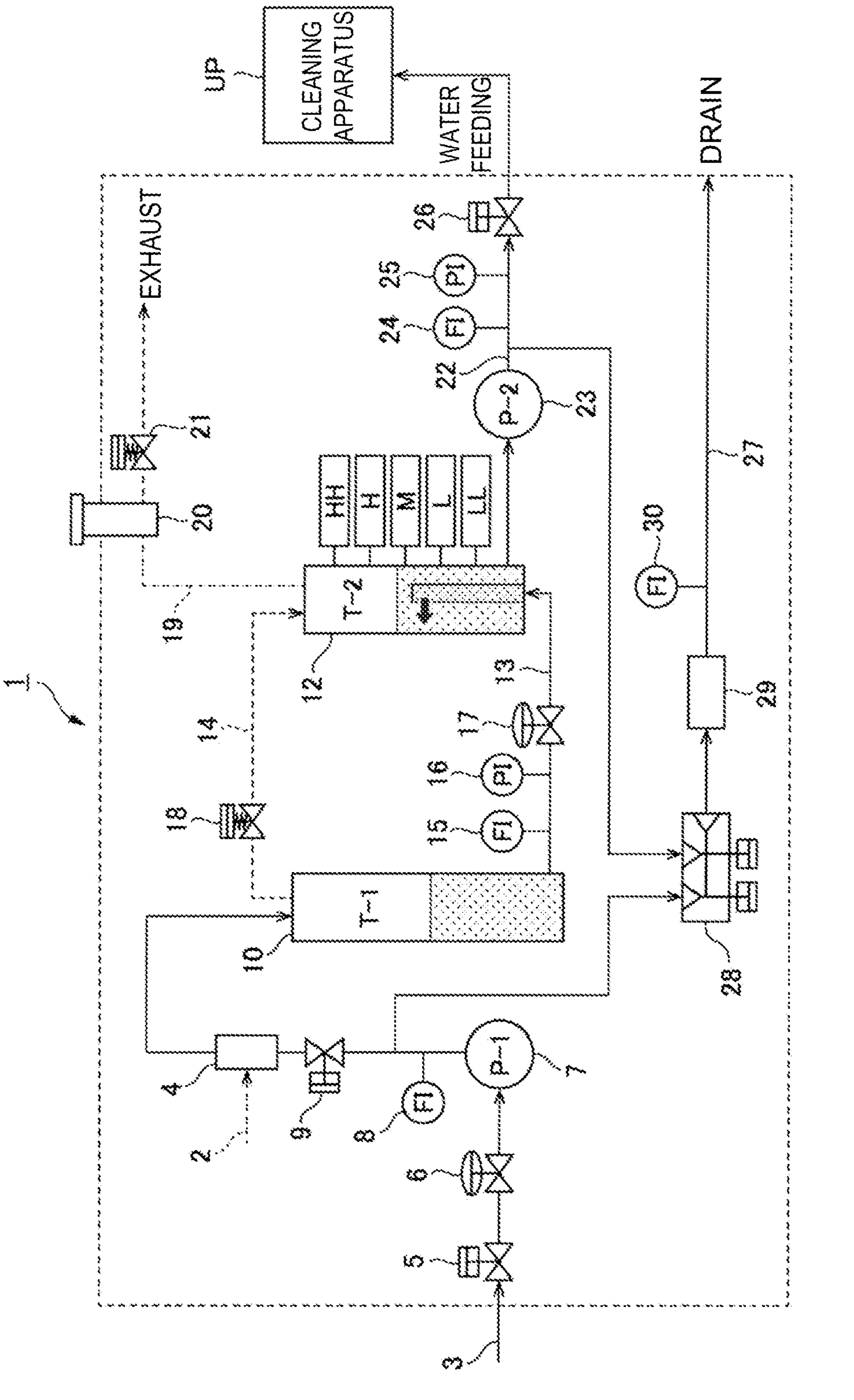
FIG. 1 is a diagram showing a configuration of a gas solution supply apparatus according to a first embodiment of the present invention.

A configuration of an ozone water supply apparatus according to a first embodiment of the present invention will be described with reference to the drawings. FIG. 1 is a diagram showing the configuration of an ozone water supply apparatus according to the present embodiment. As shown in FIG. 1, an ozone water supply apparatus 1 includes: a source gas supply line 2 to which ozone gas that is a raw material of ozone water is supplied; and a source liquid supply line 3 to which pure water (DIW) that is a raw material of ozone water is supplied.

Ozone gas is a mixture of ozone and oxygen. In the present embodiment, the partial pressure of oxygen (for example, total gas pressure P×0.85) is higher than the partial pressure of ozone (for example, total gas pressure P×0.15), and the solubility of oxygen (45 mg/L at 20 degrees) is higher than the solubility of ozone (20 mg/L at 20 degrees).

As shown in FIG. 1, the source gas supply line 2 and the source liquid supply line 3 are connected to a gas dissolving nozzle 4 that dissolves ozone gas in pure water to produce ozone water (here, also referred to as "first ozone water"). The gas dissolving nozzle 4 can dissolve high-pressure ozone gas in high-pressure pure water to produce high-concentration ozone water. Note that the gas dissolving nozzle 4 corresponds to a gas dissolving unit of the present invention.

Further, the source liquid supply line 3 is provided with: a first valve 5 that turns on/off the supply of pure water; a first pressure reducing valve 6 that reduces the pressure of the supplied pure water (the pressure varies depending on the country or region, and the pressure of the supplied pure water is sometimes very high) below a predetermined standard; a first pump 7 that pressurizes pure water to be supplied to the gas dissolving nozzle 4; a first flow meter 8 that measures the flow rate of pure water after pressurization; and a second valve 9 that turns on/off the supply of pure water after pressurization. Note that the first pump 7 corresponds to a first pressurizer of the present invention. Further, the pressure reducing valve is unnecessary when the pressure of the pure water to be supplied is originally below the standard.

The ozone water supply apparatus 1 includes a first ozone water supply line 11 that supplies the first ozone water produced by the gas dissolving nozzle 4 to a first gas-liquid separation tank 10. The first gas-liquid separation tank 10 stores the first ozone water produced by the gas dissolving nozzle 4, and produces ozone water (here, also referred to as "second ozone water") through gas-liquid separation of the first ozone water. In the present embodiment, the first pump 7 increases the pressure of the pure water supplied to the gas dissolving nozzle 4, maintaining the pressure inside the first gas-liquid separation tank 10 at a high pressure (for example, 0.30 MPa). Note that the first gas-liquid separation tank 10 corresponds to a first gas-liquid separator of the present invention.

The ozone water supply apparatus 1 also includes: a second ozone water supply line 13 that supplies the second ozone water produced in the first gas-liquid separation tank 10 to a second gas-liquid separation tank 12; and a gas delivery line 14 that delivers the gas produced through gas-liquid separation in the first gas-liquid separation tank 10 to the second gas-liquid separation tank 12. The second ozone water supply line 13 is provided with: a second flow meter 15 that measures the flow rate of the second ozone water; a first pressure gauge 16 that measures the pressure of the second ozone water; and a second pressure reducing valve 17 that depressurizes the second ozone water produced in the first gas-liquid separation tank 10. The gas delivery line 14 is provided with a first pressure regulating valve 18 that regulates the pressure of the gas to be delivered to the second gas-liquid separation tank 12. Note that the second gas-liquid separation tank 12 corresponds to a second gas-liquid separator of the present invention, and the second pressure reducing valve 17 corresponds to a pressure reducer of the present invention.

The second gas-liquid separation tank 12 stores the second ozone water depressurized by the second pressure reducing valve 17, and produces ozone water (here, also referred to as "third ozone water") through gas-liquid separation of the second ozone water. In the present embodiment, the pressure of the second ozone water to be supplied to the second gas-liquid separation tank 12 is reduced by the second pressure reducing valve 17. As a result, the pressure inside the second gas-liquid separation tank 12 is maintained at a low pressure (for example, 0.10 MPa). Note that the second gas-liquid separation tank 12 corresponds to a second gas-liquid separator of the present invention.

Further, the ozone water supply apparatus 1 includes an exhaust line 19 that exhausts the gas produced through gas-liquid separation in the second gas-liquid separation tank 12. The exhaust line 19 is provided with an ozone gas decomposition catalyst 20 that decomposes the ozone gas to render it harmless, and a second pressure regulating valve 21 that regulates the pressure of the second gas-liquid separation tank 12.

Further, the ozone water supply apparatus 1 includes a third ozone water supply line 22 that supplies the third ozone water produced in the second gas-liquid separation tank 12 to a cleaning apparatus UP (point-of-use). A third ozone water supply line 22 is provided with a second pump 23 that pressurizes the third ozone water to be supplied to the cleaning apparatus UP; a third flow meter 24 that measures the flow rate of the third ozone water to be supplied to the cleaning apparatus UP; a second pressure gauge 25 that measures the pressure of the third ozone water to be supplied to the cleaning apparatus UP; and a third valve 26 that turns on/off the supply of the third ozone water to be supplied to the cleaning apparatus UP.

Further, the ozone water supply apparatus 1 includes a drainage line 27 that: branches from the source liquid supply line 3 and the third ozone water supply line 22; and discharges the pure water supplied to the gas dissolving nozzle 4 and the third ozone water supplied to the cleaning apparatus UP, from a drain. The drainage line 27 is provided with: a switching valve 28 connected to the source liquid supply line 3 and the third ozone water supply line 22; a densitometer 29 that measures the ozone concentration of the liquid to be discharged from the drain; and a fourth flow meter 30 that measures the flow rate of liquid to be discharged from the drain. In this case, switch of the switching valve 28 allows either the pure water supplied to the gas dissolving nozzle 4 or the third ozone water supplied to the cleaning apparatus UP, to be discharged from the drain.

Here, the configuration of the second gas-liquid separation tank 12 will be described with reference to FIG. 2. However, the configuration of the second gas-liquid separation tank 12 is not limited to this, and may have a configuration similar to that of the first gas-liquid separation tank 10, for example.

Figure 2:
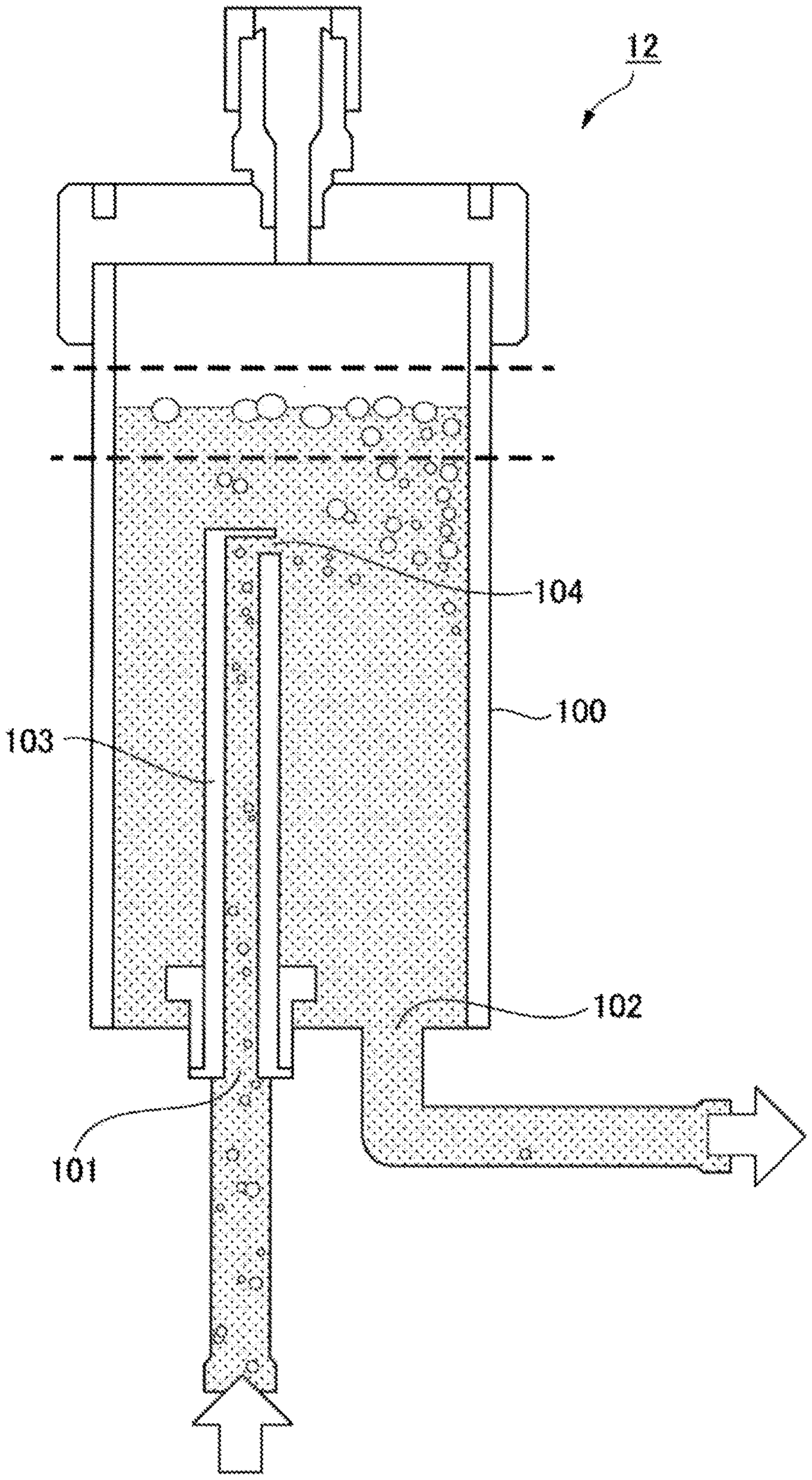
FIG. 2 is a diagram showing a configuration of a second gas-liquid separator according to the first embodiment of the present invention.

FIG. 2 is a diagram showing the configuration of the second gas-liquid separation tank 12. As shown in FIG. 2, the second gas-liquid separation tank 12 includes: a tank body 100, which stores the second ozone water supplied from the second ozone water supply line 13; an inflow port 101, disposed at the lower part of the tank body 100, into which the second ozone water supplied from the second ozone water supply line 13 flows; and a delivery port 102 disposed in the lower part of the tank body 100 and through which the third ozone water produced in the second gas-liquid separation tank 12 is delivered. The inflow port 101 is connected to an elongated tubular introduction pipe 103 extending in the up-down direction of the tank body 100. The front end (upper end) of the introduction pipe 103 is provided with an opening 104 that opens sideways (horizontally) at a position slightly below the liquid surface of the tank body 100.

When the second ozone water is depressurized by the second pressure reducing valve 17 and supplied to the second gas-liquid separation tank 12, the gas (oxygen)

dissolved in the second ozone water in supersaturation is generated as bubbles. At this time, the bubbles are discharged sideways (horizontally) from the opening 104. Therefore, the bubbles can be quietly generated compared to a case in which the bubbles are discharged upward from the lower part of the tank body 100 (from a position considerably below the liquid surface).

Figure 8:
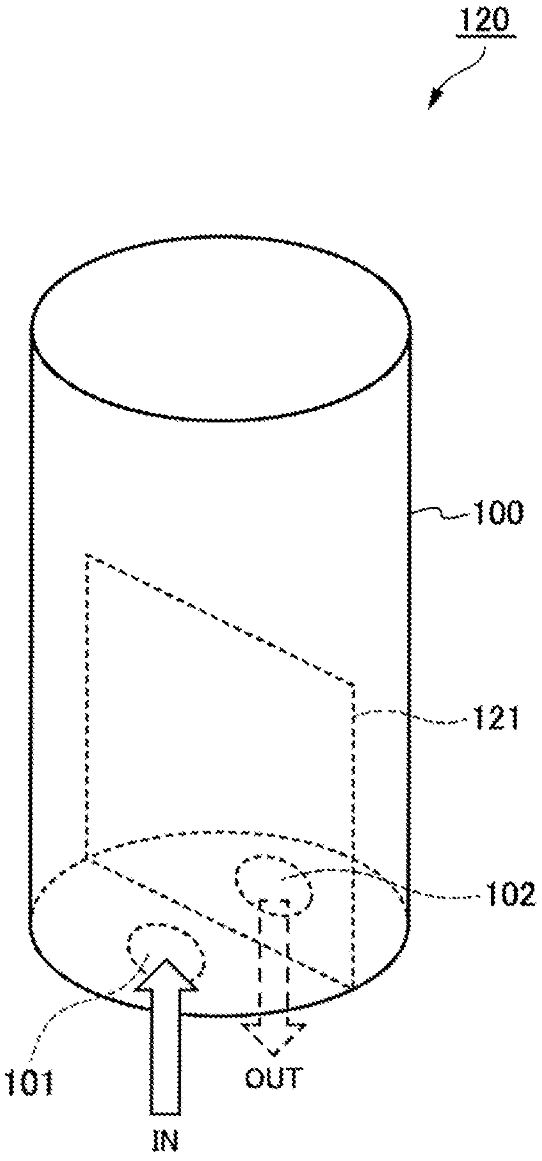
FIG. 8 is a diagram showing another example of the second gas-liquid separator.

FIG. 8 is a diagram showing the configuration of another example of the second gas-liquid separation tank. The second gas-liquid separation tank 120 of FIG. 8 is provided with: an inflow port 101, disposed in the lower part of the tank body 100, into which the second ozone water supplied from the second ozone water supply line 13 flows; a delivery port 102, disposed at the lower part of the tank body 100, from which the third ozone water produced in the second gas-liquid separation tank 120 is delivered; and a partition plate 121, disposed between the inflow port 101 and the delivery port 102 up to a position slightly below the liquid surface, so as to partition the inside of the tank body 100. In this case, bubbles are generated from the second ozone water in the partitioned area on the side of the inflow port 101 and rise toward the liquid surface. This makes it possible to prevent the bubbles from being mixed in the third ozone water delivered from the delivery port 102.

According to the ozone water supply apparatus 1 of the first embodiment, when ozone gas is dissolved in pure water with the gas dissolving nozzle 4 so that the first ozone water is produced, the produced first ozone water is stored in the first gas-liquid separation tank 10, and the second ozone water is produced by gas-liquid separation of the first ozone water. The second ozone water produced in the first gas-liquid separation tank 10 is depressurized with the second pressure reducing valve 17, and the depressurized second ozone water is stored in the second gas-liquid separation tank 12. At this time, the gas (ozone) dissolved in supersaturation is generated as bubbles and removed. Then, the third ozone water, which is produced through gas-liquid separation of the second ozone water, is supplied to the point-of-use. In this way, gas-liquid separation after depressurization causes the gas dissolved in supersaturation to be generated as bubbles and removed. Therefore, even if the ozone water (third ozone water) to be supplied to the point-of-use has a high concentration, it is possible to prevent bubbles from being generated in use at the point-of-use.

Further, in the present embodiment, the pressure of pure water to be supplied to the gas dissolving nozzle 4 can be increased by the first pump 7. Therefore, the high-concentration first ozone water can be produced by the gas dissolving nozzle 4, enabling production of the high-concentration third ozone water.

Further, in the present embodiment, the second pump 23 can increase the pressure of the third ozone water to be supplied to the point-of-use to the pressure required at the point-of-use.

Further, in the present embodiment, the partial pressure of oxygen (for example, total gas pressure P×0.85) is higher than the partial pressure of ozone (for example, total gas pressure P×0.15), and the solubility of oxygen (45 mg/L at 20 degrees) is higher than the solubility of ozone (20 mg/L at 20 degrees). Therefore, oxygen is more likely to dissolve in supersaturation in pure water than ozone. In other words, oxygen bubbles are likely to be generated. In this case, gas-liquid separation after depressurization causes the gas (oxygen) dissolved in supersaturation to be generated as bubbles and removed. This makes it possible to prevent bubbles from being generated in use at the point-of-use.

Second Embodiment

Next, an ozone water supply apparatus according to a second embodiment of the present invention will be described. Here, the ozone water supply apparatus of the second embodiment will be described mainly with respect to the differences from the first embodiment. The configuration and operation of the present embodiment are the same as those of the first embodiment unless otherwise specified.

Figure 3:
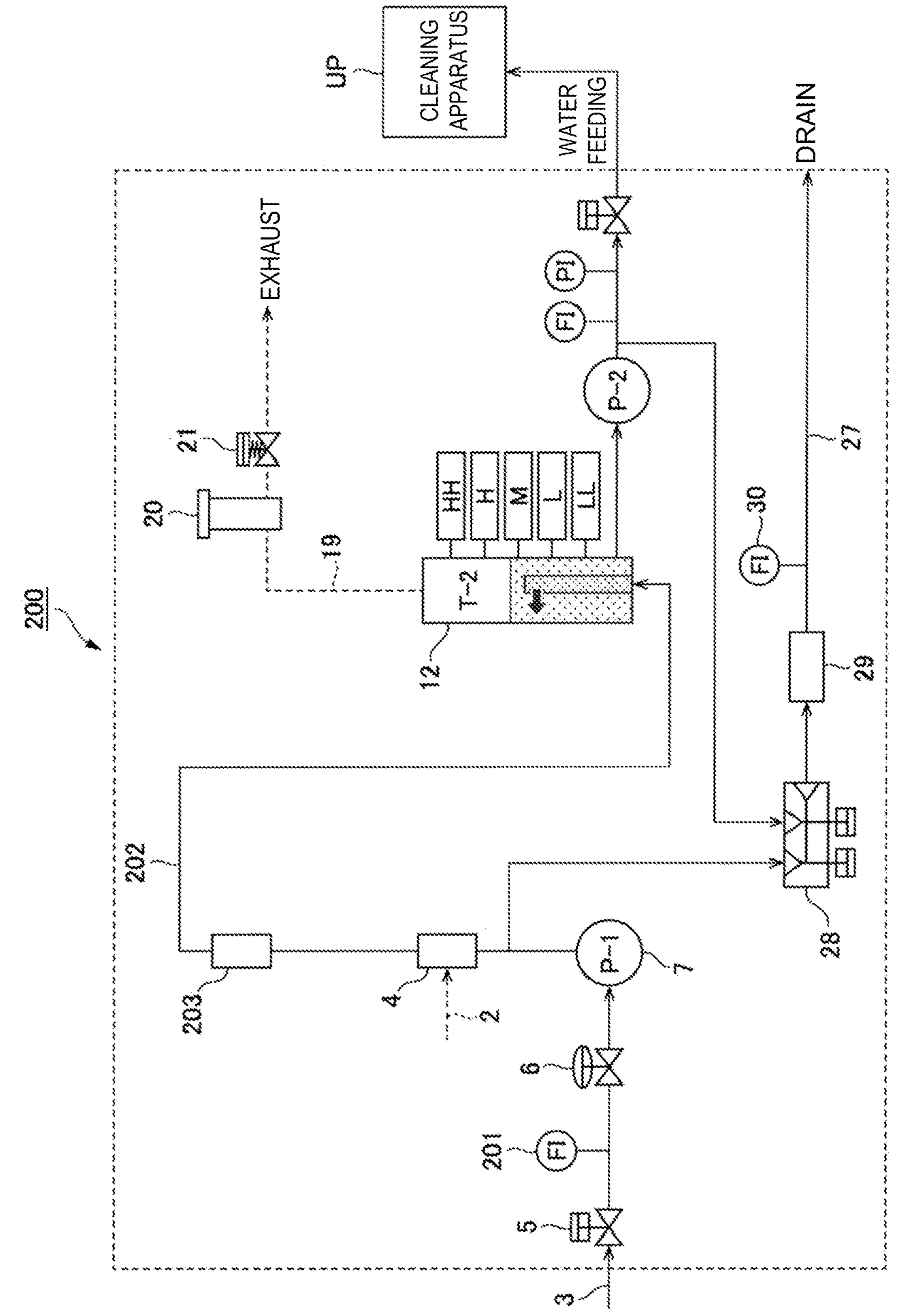
FIG. 3 is a diagram showing a configuration of a gas solution supply apparatus according to a second embodiment of the present invention.

FIG. 3 is a diagram showing the configuration of the ozone water supply apparatus of the present embodiment. As shown in FIG. 3, the ozone water supply apparatus 200 of the present embodiment does not include the first gas-liquid separation tank. In this case, the second gas-liquid separation tank 12 corresponds to a gas-liquid separator of the present invention. Further, in the present embodiment, the source liquid supply line 3 is provided with a fifth flow meter 201 that measures the flow rate of the supplied pure water.

Further, the ozone water supply apparatus 200 of the present embodiment includes a fourth ozone water supply line 202 that supplies the first ozone water produced by the gas dissolving nozzle 4 to the second gas-liquid separation tank 12. The fourth ozone water supply line 202 is provided with a gas dissolving nozzle 203 that reduces the pressure of the first ozone water, produced by the gas dissolving nozzle 4, by pressure loss. In this case, the gas dissolving nozzle 203 that reduces the pressure by pressure loss corresponds to a pressure reducer of the present invention.

The ozone water supply apparatus 200 of the second embodiment also exhibits action effects similar to those of the first embodiment.

In other words, when the gas dissolving nozzle 4 dissolves ozone gas in pure water to produce the first ozone water, the produced first ozone water is depressurized in the gas dissolving nozzle 203, and the depressurized first ozone water is stored in the second gas-liquid separation tank 12. At this time, the gas (ozone) dissolved in supersaturation is generated as bubbles and removed. Then, the ozone water produced through gas-liquid separation of the first ozone water, which is also referred to as "fourth ozone water" herein and corresponds to the third ozone water in the first embodiment, is supplied to the point-of-use. In this way, gas-liquid separation after depressurization causes the gas dissolved in supersaturation to be generated as bubbles and removed. Therefore, even if the ozone water (fourth ozone water) to be supplied to the point-of-use has a high concentration, it is possible to prevent bubbles from being generated in use at the point-of-use.

Further, in the present embodiment, the pressure of pure water to be supplied to the gas dissolving nozzle 4 can be increased by the first pump 7. Therefore, the high-concentration first ozone water can be produced by the gas dissolving nozzle 4, enabling production of the high-concentration fourth ozone water.

Further, in the present embodiment, the pressure of the fourth ozone water to be supplied to the point-of-use can be increased by the second pump 23 to the pressure required at the point-of-use.

Further, in the present embodiment, the partial pressure of oxygen (for example, total gas pressure P×0.85) is higher than the partial pressure of ozone (for example, total gas pressure P×0.15), and the solubility of oxygen (45 mg/L at 20 degrees) is higher than the solubility of ozone (20 mg/L at 20 degrees). Therefore, oxygen is more likely to dissolve in supersaturation in pure water than ozone. In other words, oxygen bubbles are likely to be generated. In this case, gas-liquid separation after depressurization causes the gas (oxygen) dissolved in supersaturation to be generated as bubbles and removed. This makes it possible to prevent bubbles from being generated in use at the point-of-use.

Third Embodiment

Next, an ozone water supply apparatus according to a third embodiment of the present invention will be described. Here, the ozone water supply apparatus of the third embodiment will be described mainly with respect to the differences from the second embodiment. The configuration and operation of the present embodiment are the same as those of the second embodiment unless otherwise specified.

Figure 4:
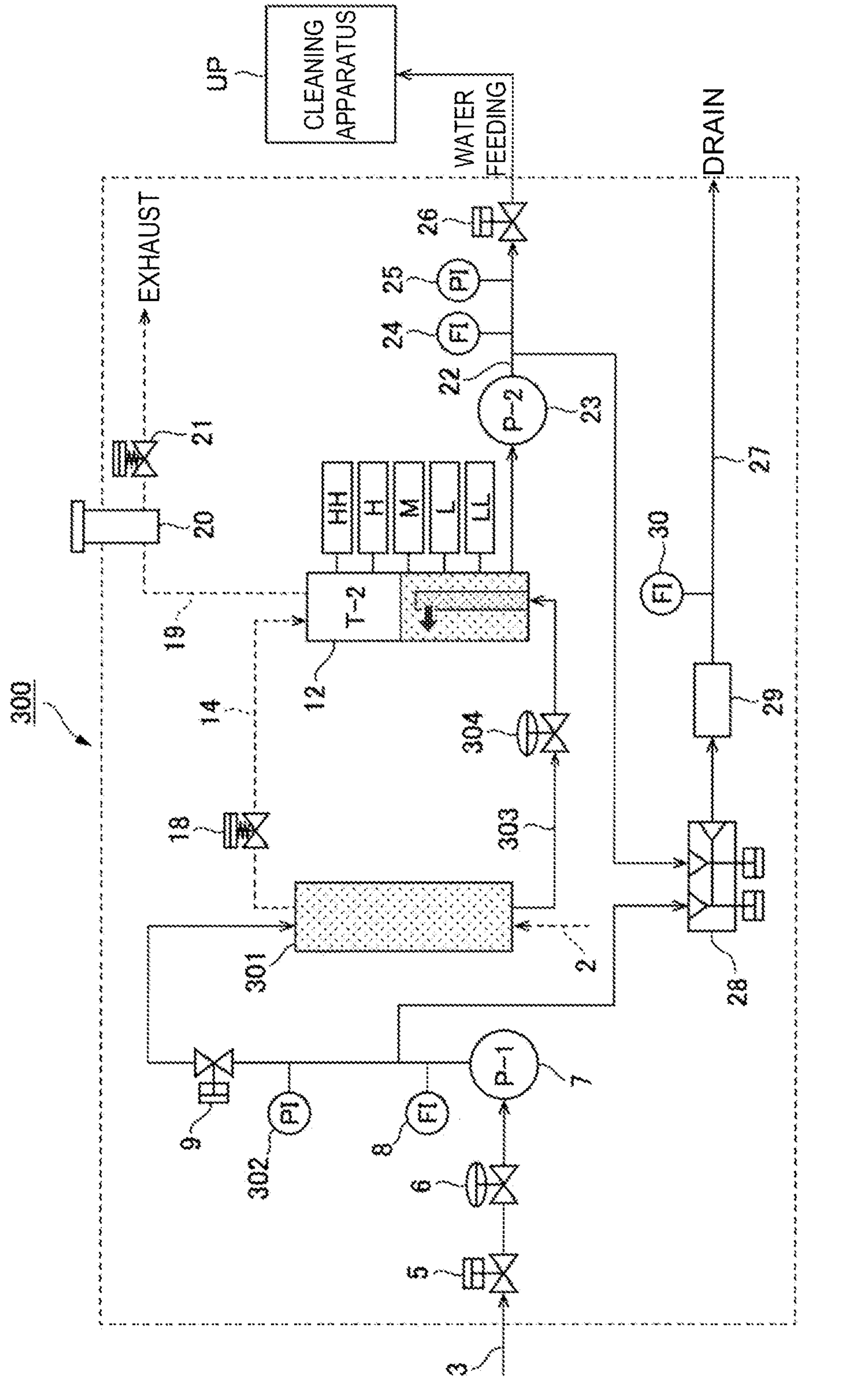
FIG. 4 is a diagram showing a configuration of a gas solution supply apparatus according to a third embodiment of the present invention.

FIG. 4 is a diagram showing the configuration of the ozone water supply apparatus of the present embodiment. As shown in FIG. 4, in the ozone water supply apparatus 300 of the present embodiment, a dissolving film 301 is used instead of the gas dissolving nozzle 4 to dissolve ozone gas in pure water to produce the first ozone water. In this case, the dissolving film 301 corresponds to a gas dissolving unit of the present invention. Further, in the present embodiment, the source liquid supply line 3 is provided with a third pressure gauge 302 that measures the pressure of the supplied pure water.

Further, the ozone water supply apparatus 300 of the present embodiment includes a fifth ozone water supply line 303 that supplies the first ozone water produced by the dissolving film 301 to the second gas-liquid separation tank 12. The fifth ozone water supply line 303 is provided with a third pressure reducing valve 304 that depressurizes the first ozone water produced by the dissolving film 301. In this case, the third pressure reducing valve 304 corresponds to a pressure reducer of the present invention.

The ozone water supply apparatus 300 of the third embodiment also exhibits action effects similar to those of the second embodiment.

In other words, when the dissolving film 301 dissolves ozone gas in pure water to produce the first ozone water, the produced first ozone water is depressurized by the third pressure reducing valve 304, and the depressurized first ozone water is stored in the second gas-liquid separation tank 12. At this time, the gas (ozone) dissolved in supersaturation is generated as bubbles and removed. Then, the ozone water produced through gas-liquid separation of the first ozone water, which is also referred to as “fifth ozone water” herein and corresponds to the third ozone water in the first embodiment, is supplied to the point-of-use. In this way, gas-liquid separation after depressurization causes the gas dissolved in supersaturation to be generated as bubbles and removed. Therefore, even if the ozone water (fifth ozone water) to be supplied to the point-of-use has a high concentration, it is possible to prevent bubbles from being generated in use at the point-of-use.

Further, in the present embodiment, the pressure of pure water supplied to the dissolving film 301 can be increased by the first pump 7. Therefore, the high-concentration first ozone water can be produced by the dissolving film 301, enabling production of the high-concentration fifth ozone water.

Further, in the present embodiment, the pressure of the fifth ozone water to be supplied to the point-of-use can be increased by the second pump 23 to the pressure required at the point-of-use.

Further, in the present embodiment, the partial pressure of oxygen (for example, total gas pressure P×0.85) is higher than the partial pressure of ozone (for example, total gas pressure P×0.15), and the solubility of oxygen (45 mg/L at 20 degrees) is higher than the solubility of ozone (20 mg/L at 20 degrees). Therefore, oxygen is more likely to dissolve in supersaturation in pure water than ozone. In other words, oxygen bubbles are likely to be generated. In this case, gas-liquid separation after depressurization causes the gas (oxygen) dissolved in supersaturation to be generated as bubbles and removed. This makes it possible to prevent bubbles from being generated in use at the point-of-use.

In the above description, description is made on a case in which the ozone water supply apparatus is a one-way type that only supplies ozone water to the point-of-use. However, the ozone water supply apparatus may be of a circulation type in which the ozone water supplied to the point-of-use is circulated to be returned. An example (modification) of the ozone water supply apparatus of a circulation type will be described below.

(Modification 1)

Figure 5:
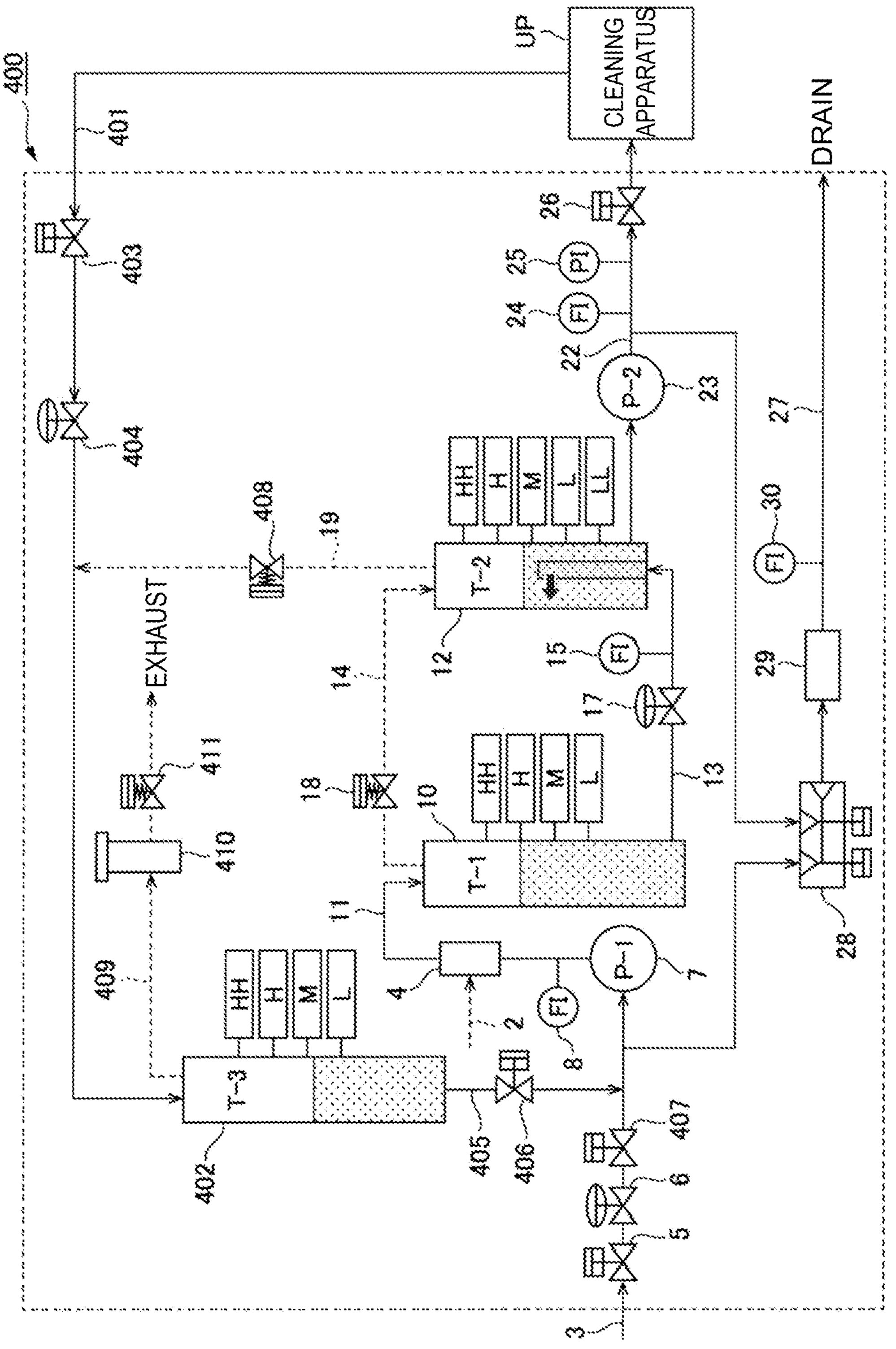
FIG. 5 is a diagram showing a configuration of Modification 1 of the gas solution supply apparatus of the present invention.

FIG. 5 is a diagram showing the configuration of Modification 1 of an ozone water supply apparatus of a circulation type. As shown in FIG. 5, an ozone water supply apparatus 400 of this Modification 1 includes: a first circulation line 401 that circulates unused ozone water back from the cleaning apparatus UP of the point-of-use to the ozone water supply apparatus 400; and a third gas-liquid separation tank 402 connected to the first circulation line 401. Note that, in this Modification 1, air-driven pumps are used as the first pump 7 and the second pump 23.

The first circulation line 401 is provided with: a fourth valve 403 that turns on/off the supply of ozone water to be returned to the third gas-liquid separation tank 402; and a fourth pressure reducing valve 404 that depressurizes the ozone water to be returned to the third gas-liquid separation tank 402.

The ozone water produced through gas-liquid separation in the third gas-liquid separation tank 402 is supplied to the source liquid supply line 3 through the sixth ozone water supply line 405. The sixth ozone water supply line 405 is provided with a fifth valve 406 that turns on/off the supply of the ozone water to be returned to the source liquid supply line 3. Further, the source liquid supply line 3 is provided with a sixth valve 407 that turns on/off the supply of pure water to the first pump 7.

Further, in this Modification 1, the exhaust line 19 from the second gas-liquid separation tank 12 is connected to the first circulation line 401. The exhaust line 19 is provided with a third pressure regulating valve 408 that regulates the pressure of the gas to be discharged to the first circulation line 401.

Furthermore, the ozone water supply apparatus 400 of this Modification 1 includes a second exhaust line 409 that exhausts the gas produced through gas-liquid separation in the third gas-liquid separation tank 402. The second exhaust line 409 is provided with: a second ozone gas decomposition catalyst 410 that decomposes the ozone gas to render it harmless; and a fourth pressure regulating valve 411 that regulates the pressure of the gas rendered harmless to a pressure similar to the atmospheric pressure.

(Modification 2)

Figure 6:
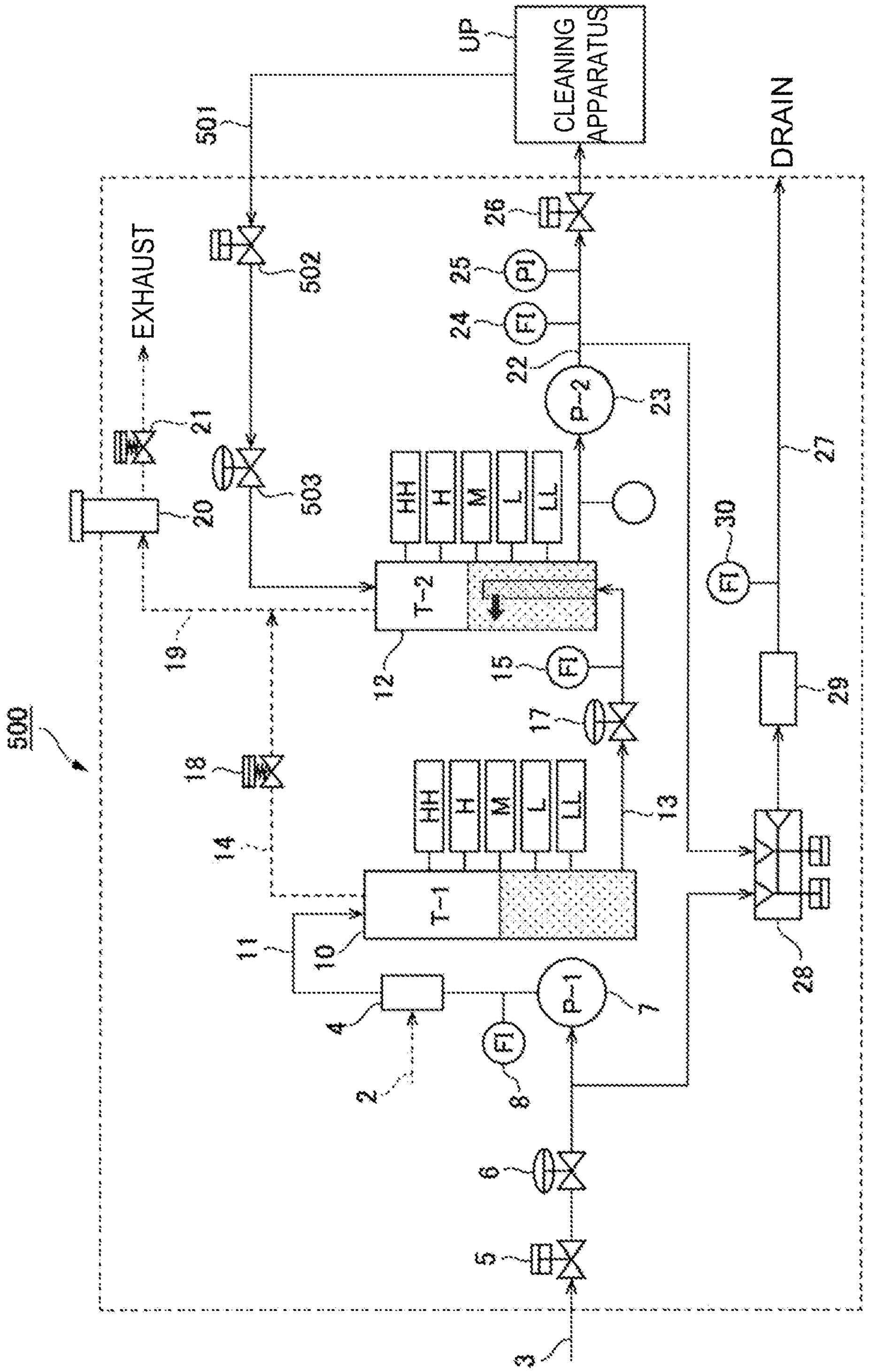
FIG. 6 is a diagram showing a configuration of Modification 2 of the gas solution supply apparatus of the present invention.

FIG. 6 is a diagram showing the configuration of Modification 2 of an ozone water supply apparatus of a circulation type. As shown in FIG. 6, an ozone water supply apparatus 500 of this Modification 2 includes a second circulation line 501 that circulates unused ozone water back from the cleaning apparatus UP of the point-of-use to the ozone water supply apparatus 500. Note that, in this Modification 2, a centrifugal pump is used as the first pump 7 and an air-driven pump is used as the second pump 23.

In this Modification 2, the second circulation line 501 is connected to the second gas-liquid separation tank 12. The second circulation line 501 is provided with: a seventh valve 502 that turns on/off the supply of the ozone water to be returned to the second gas-liquid separation tank 12; and a fifth pressure reducing valve 503 that depressurizes the ozone water to be returned to the second gas-liquid separation tank 12.

(Modification 3)

Figure 7:
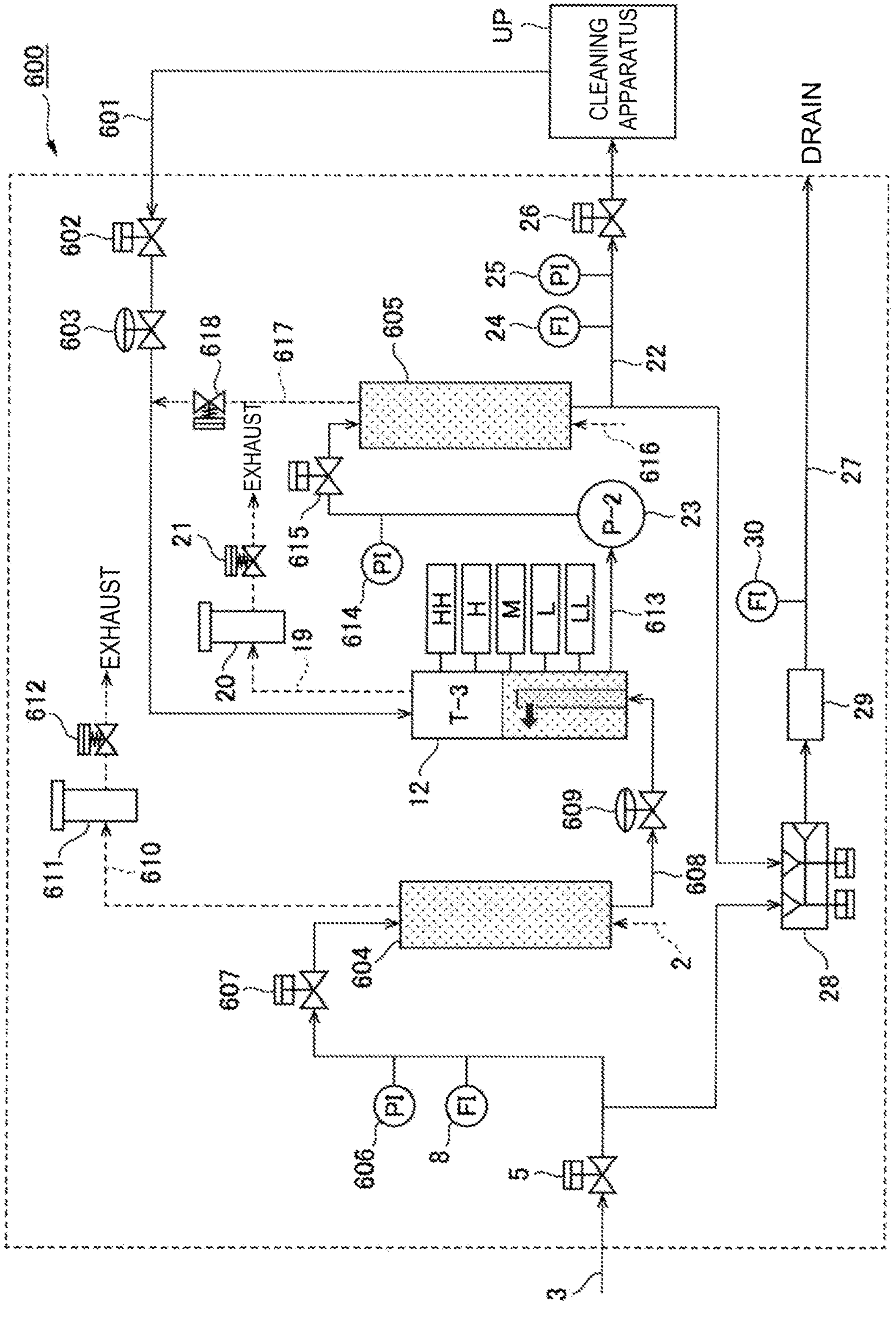
FIG. 7 is a diagram showing a configuration of Modification 3 of the gas solution supply apparatus of the present invention.

FIG. 7 is a diagram showing the configuration of Modification 3 of an ozone water supply apparatus of a circulation type. As shown in FIG. 7, an ozone water supply apparatus 600 of this Modification 3 includes a third circulation line 601 that circulates unused ozone water back from the cleaning apparatus UP of the point-of-use to the ozone water supply apparatus 600. Note that, in this Modification 3, an air-driven pump is used as the second pump 23.

In this Modification 3, the third circulation line 601 is connected to the second gas-liquid separation tank 12. The third circulation line 601 is provided with: an eighth valve 602 that turns on/off the supply of the ozone water to be returned to the second gas-liquid separation tank 12; and a sixth pressure reducing valve 603 that depressurizes the ozone water to be returned to the second gas-liquid separation tank 12.

Further, this Modification 3 has two dissolving films (a second dissolving film 604 and a third dissolving film 605). The second dissolving film 604 is connected to the source gas supply line 2 and the source liquid supply line 3. The source liquid supply line 3 is provided with: a fourth pressure gauge 606 that measures the pressure of pure water to be supplied to the second dissolving film 604; and a ninth valve 607 that turns on/off the supply of pure water to the second dissolving film 604.

The ozone water supply apparatus 600 of Modification 3 includes a seventh ozone water supply line 608 that supplies the first ozone water produced by the second dissolving film 604 to the second gas-liquid separation tank 12. The seventh ozone water supply line 608 is provided with a seventh pressure reducing valve 609 that depressurizes the first ozone water produced by the second dissolving film 604.

Further, the ozone water supply apparatus 600 of Modification 3 includes a third exhaust line 610 that exhausts the gas discharged from the second dissolving film 604. The third exhaust line 610 is provided with: a third ozone gas decomposition catalyst 611 that decomposes the gas discharged from the second dissolving film 604 to render it harmless; and a fifth pressure regulating valve 612 that regulates the pressure of the ozone gas to a pressure lower than the water pressure of the second dissolving film 604.

Further, the ozone water supply apparatus 600 of Modification 3 includes an eighth ozone water supply line 613 that supplies the ozone water produced in the second gas-liquid separation tank 12 to the third dissolving film 605. The eighth ozone water supply line 613 is provided with: a fifth pressure gauge 614 that measures the pressure of the ozone water to be supplied to the third dissolving film 605; and a tenth valve 615 that turns on/off the supply of ozone water to the third dissolving film 605.

The third dissolving film 605 is connected to a second source gas supply line 616 that supplies a source gas (ozone gas). The ozone water produced by the third dissolving film 605 is supplied to the cleaning apparatus UP of the point-of-use. Further, the ozone water supply apparatus 600 of Modification 3 includes a fourth exhaust line 617 that discharges the gas discharged from the third dissolving film 605 to the third circulation line 601. The fourth exhaust line 617 is provided with a sixth pressure regulating valve 618 that regulates the pressure of the gas to be discharged to the third circulation line 601.

Although the embodiments of the present invention are described above by way of illustration, the scope of the present invention is not limited to these and can be changed and modified according to the purpose within the scope described in the claims.

For example, in the above description, the examples are described in which ozone water is produced by dissolving ozone gas in pure water. However, the present invention is applicable not only to ozone water but also to other gas solutions in the same manner if the gas solutions can each be produced by dissolving a source gas in a source liquid.

INDUSTRIAL APPLICABILITY

As described above, the gas solution supply apparatus according to the present invention has an effect of preventing bubbles from being generated in use at the point-of-use even if a gas solution provided to the point-of-use has a high concentration, and is useful as an apparatus such as an ozone water supply apparatus that supplies ozone water to a wafer cleaning apparatus.

REFERENCE SIGNS LIST

- 1 ozone water supply apparatus (gas solution supply apparatus)
- 2 source gas supply line
- 3 source liquid supply line
- 4 gas dissolving nozzle (gas dissolving unit)
- 5 first valve
- 6 first pressure reducing valve
- 7 first pump (first pressurizer)
- 8 first flow meter
- 9 second valve
- 10 first gas-liquid separation tank (first gas-liquid separator)
- 11 first ozone water supply line
- 12 second gas-liquid separation tank (second gas-liquid separator)
- 13 second ozone water supply line
- 14 gas delivery line
- 15 second flow meter
- 16 first pressure gauge
- 17 second pressure reducing valve (pressure reducer)
- 18 first pressure regulating valve
- 19 exhaust line
- 20 ozone gas decomposition catalyst
- 21 second pressure regulating valve
- 22 third ozone water supply line
- 23 second pump (second pressurizer)
- 24 third flow meter
- 25 second pressure gauge
- 26 third valve
- 27 drainage line
- 28 switching valve
- 29 densitometer
- 30 fourth flow meter
- UP cleaning apparatus (point-of-use)

What is claimed is:

1. A gas solution supply apparatus comprising:

a gas dissolving unit comprising a gas dissolving nozzle that dissolves a source gas in a source liquid to produce a first gas solution;

a first gas-liquid separator that stores the first gas solution produced and produces a second gas solution through gas-liquid separation of the first gas solution;

a pressure reducer comprising a pressure reducing valve that depressurizes the second gas solution produced in the first gas-liquid separator; and a second gas-liquid separator that stores the second gas solution having been depressurized and produces a third gas solution through gas-liquid separation of the second gas solution, wherein the third gas solution is supplied to a point-of-use, the source gas is a mixture of a first source gas and a second source gas, and a partial pressure of the second source gas is higher than a partial pressure of the first source gas, and a solubility of the second source gas is higher than a solubility of the first source gas.

2. The gas solution supply apparatus according to claim 1, further comprising a first pressurizer that pressurizes the source liquid to be supplied to the gas dissolving unit.

3. The gas solution supply apparatus according to claim 1, further comprising a second pressurizer that pressurizes the third gas solution to be supplied to the point-of-use.

* * * * *